United States Patent [19]

Rockenfeller

[11] Patent Number: 5,328,671

[45] Date of Patent: * Jul. 12, 1994

[54] HEAT AND MASS TRANSFER

[75] Inventor: Uwe Rockenfeller, Boulder City, Nev.

[73] Assignee: Rocky Research, Boulder City, Nev.

[*] Notice: The portion of the term of this patent subsequent to Mar. 29, 2011 has been disclaimed.

[21] Appl. No.: 931,036

[22] Filed: Aug. 14, 1992

Related U.S. Application Data

[63] Continuation-in-part of Ser. No. 320,562, Mar. 8, 1989, abandoned.

[51] Int. Cl.$^5$ .................... C01B 17/04; C01C 1/02
[52] U.S. Cl. .................... 423/210; 423/237; 423/244.01; 423/659
[58] Field of Search .................. 55/68, 70, 73, 74, 75; 423/237, 244.01, 210, 659

[56] References Cited

U.S. PATENT DOCUMENTS

| | | |
|---|---|---|
| 1,686,425 | 10/1928 | Von Platen et al. |
| 1,881,568 | 10/1932 | Henney |
| 1,972,426 | 9/1934 | Noebel |
| 2,067,678 | 1/1937 | Nesselmann |
| 2,196,021 | 4/1940 | Merrill |
| 2,384,460 | 10/1941 | af Kleen |

FOREIGN PATENT DOCUMENTS

| | | |
|---|---|---|
| 664520 | 5/1965 | Belgium |
| 436988 | 11/1926 | Fed. Rep. of Germany |
| 417044 | 12/1932 | United Kingdom |
| 415488 | 3/1933 | United Kingdom |
| 424456 | 4/1934 | United Kingdom |

OTHER PUBLICATIONS

*Refrigerating Engineering.* "Absorption Refrigeration with Solid Absorbents", by R. M. Buffington, pp. 137-142 (Sep., 1933).

Primary Examiner—Wayne Langel
Attorney, Agent, or Firm—Jerry R. Seiler

[57] ABSTRACT

In a chemisorption reaction process wherein a polar gas is repeatedly alternately adsorbed and desorbed on a complex compound formed by adsorbing said polar gas on a metal salt, said complex compound capable of having a first density if allowed to expand without restriction during said adsorption, a method of increasing the reaction rates of said chemisorption reaction process comprises controlling the volumeric expansion of said complex compound formed during at least the initial adsorption reaction of said polar gas on said metal salt to form at least a partially structurally immobilized, self-supporting, coherent, reaction product mass having a second density. The metal salt may also be mixed with a zeolite, activated carbon, activated alumina or silica gel prior to the first adsorption reaction. In another embodiment, the polar gas is used initially to form a complex compound with the salt and thereafter desorbed and a nonpolar gas used for being adsorbed and desorbed on the zeolite, activated carbon, activated alumina silica gel, or metal hydride.

29 Claims, 1 Drawing Sheet

HEAT AND MASS TRANSFER

This patent application is a continuation-in-part of U.S. patent application Ser. No. 07/320,562, filed Mar. 8, 1989, abandoned.

BACKGROUND OF THE INVENTION

Adsorption/desorption reactions between polar gases and certain metal salts yield complex compounds which are the basis for efficient refrigeration, thermal storage and heat pump systems having high energy density. However, energy density, a measure of the quantity of polar gas adsorbed on the salt, which translates into the amount of work or energy which can be stored in a given amount of the complex compound, is only one parameter to be considered in designing commercially attractive systems. Of significance, if not greater importance, are the reaction rates between the gas and the complex compound, which result in the time it takes to adsorb and desorb a given amount of the gas from the complex compound. Increased or maximized reaction rates result in increased or improved power that can be delivered by the system, i.e., more energy delivered over a period of time, which translates into greater heating and/or cooling capability of the system. In the aforesaid application, there is described a method and apparatus for achieving high reaction rates in solid-gas reactor systems and improve heat and mass transfer, i.e., thermal conductivity and gas diffusion in the reacting mass, by controlling the desirable density of the solid reactant during adsorption of a gaseous reactant. A preferred method disclosed for improving the reaction rates comprises restricting the volumetric expansion of the complex compounds formed between polar gaseous reactants and solid metallic salts during the chemisorption reactions. The results of such methods yield complex compounds having physical properties further disclosed herein.

SUMMARY OF THE INVENTION

It is the object herein to further describe and define criteria for achieving improved reaction rates as disclosed in my aforesaid application. It has been found that an important criterion for achieving improved reaction rates is by carrying out the initial adsorption reaction between the polar gas and the metal salt under conditions resulting in a complex compound having a coherent, cohesive, contiguous mass, and which is capable of retaining its physical structure and shape throughout repeated adsorption and desorption reaction cycles. Reaction parameters and apparatus features and components for achieving such results will be described herein. In one embodiment of the invention, a method for improving reaction rates between polar gaseous reactants and inorganic metal salts comprises determining the independent parameters of the thermal diffusion path, and the mass diffusion path for the gaseous reactant through the metal salt, respectively, in a given reactor or reaction chamber, determining an economically optimized reaction rate between the gas and the salt in the reaction chamber, determining a reaction density of the complex compound needed to achieve the optimum reaction rate, and carrying out the reaction under such conditions as are needed to maintain the desired complex compound properties necessary to achieve the desirable results.

DETAILED DESCRIPTION OF THE INVENTION

Figure 1:
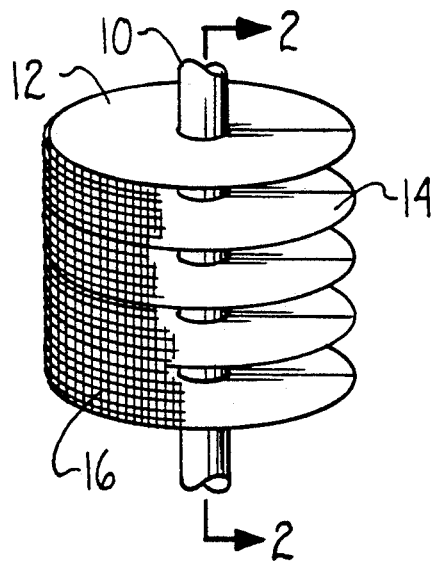
FIG. 1 illustrates a reactor having a plurality of fixed volume reaction chambers.

In my aforesaid application, the method of achieving high reaction rates in complex compounds formed by adsorbing a polar gas on a metal salt is achieved by optimizing the density of the complex compound throughout the adsorption and desorption reactions. Complex compounds formed by the polar gas and metal salt are characterized by significant, and typically substantial volumetric expansion during the initial adsorption reaction. In my aforesaid application, the invention comprises controlling and optimizing the density of the complex compound by restricting the volumetrical expansion of the reaction product. The expansion of the solid is preferably limited to between about 1.1 and about 4.5 times the initial solid sorbent volume introduced into the reaction chamber prior to exposure to the gaseous reactant. Typically the density of the reactant mass solid is maintained at between about 0.2 and about 2.5 g/cc. As further disclosed therein, reaction rates are dependent on the thermal conductivity of the solid as well as its gas diffusivity. In order to optimize or maximize the reaction rates, the optimum balance between the thermal conductivity and porosity to provide for high energy or heat transfer balanced with adequate mass transfer or diffusion of the gas through the solid must be achieved. The specific methods and apparatus disclosed in my aforesaid application for achieving such results are incorporated herein by reference.

According to the present invention, the reaction rates of adsorption and desorption of a polar gas with a complex compound consisting of the polar gas and a metal salt are increased by carrying out at least the initial adsorption reaction under conditions so as to achieve a complex compound having a physical structure different from the unreacted salt, and which is at least partially a physically coherent, cohesive, self supporting mass. Such a reaction product is achieved by optimizing the density of the complex compound by limiting the volumetric expansion of the complex compound formed during the initial adsorption reaction. The complex compounds have a potential reaction product volume increase of between about 10% and up to about 1000% of the volume of the original uncompacted and unreacted salt. This growth occurs substantially during the initial adsorption of the polar gas on the previously unreacted metal salt. Where the initial adsorption reaction is allowed to proceed without controlling the reaction product density by restricting the volumeric expansion, the resulting reaction product does not achieve the desired coherent, self-supporting mass. Instead, the product is amorphous and powdery, and the product mass will not support its shape or structure. Moreover, once the complex compound is so formed, the physical characteristic of the product is substantially irreversible, and the desired structure cannot be achieved by further adsorption or desorption unless the complex compound is desorbed, and thereafter introduced into a volumetrically restricted heat exchanger (reaction chamber) cavity and reacted according to the invention. It is also found that such a volumetrically unrestricted complex compound reaction product has substantially reduced adsorption/desorption reaction rates as compared to reaction products in which the volumetric expansion is limited and the density of the reaction product is controlled.

More specifically, according to the invention, the initial adsorption reaction is carried out under conditions for limiting the volumetric expansion of the reaction product which results in a complex compound solid having a physical mass that is different from that of the unreacted salt. The unreacted metal salt is typically a powdery particulate material, usually pourable and freely flowing in its dry and uncoordinated form, and which readily conforms to the interior shape of the reaction chamber into which it is introduced. Where the complex compound is formed under initial adsorption reaction conditions in which the density of the reaction product is controlled and optimized by restricting the volumetric expansion according to the invention, the complex compound reaction product often has a substantially different structure and physical property which is at least partially immobilized and self-supporting. For many of the salts, following a single adsorption cycle with volumetric expansion control, substantially the entire complex compound reaction product is a stiffened, coherent, cohesive, self-supporting mass which maintains its shape, even after the gaseous reactant is substantially completely desorbed therefrom and thereafter through repeated adsorption/desorption cycles. For other complex compounds, a portion of the reaction product has the aforesaid properties. Moreover, the complex compound reaction product mass will maintain its new structure without falling apart or becoming powdery unless it is subjected to substantial physical abuse or deterioration. Specifically, the ammoniated complex compounds of $SrCl_2$, $SrBr_2$, $CaCl_2$, $CaBr_2$, $CaI_2$, $CoCl_2$, $CoBr_2$, $BaCl_2$, $BaBr_2$, $MgCl_2$, $MgBr_2$, $FeCl_2$, $FeBr_2$, $NiCl_2$, $ZnCl_2$, $MnCl_2$, $MnBr_2$, $CrCl_2$ and $SnCl_2$ when reacted under volumetrically restricted conditions according to the invention are found to be stabilized or immobilized in the form of a homogenous mass which is stiff and structurally physically quite self-supporting. The structure of the ammoniated complex compound of $CaBr_2$ is distinctive from complex compounds of the other aforesaid metal salts and although there is usually a substantial portion of the reaction mass that is coherent and self-supporting, the reaction product mass is not totally or fully immobilized or homogenous. The $CaBr_2 \cdot 2\text{-}6(NH_3)$ complex compounds are less cohesive, typically having up to about one-third of the total mass, which crumbles and separates from the remaining self supporting and immobilized mass while still possessing reactivity enhancement having the same optimization parameters applicable to the other salts. It is to be understood that the high reaction rates of the improved complex compounds formed according to the invention are not dependent on the specific physical characteristics of the different reaction products. Thus, improved reaction rates are inherent with the reaction products formed by properly controlled and limited volumetric expansion during the initial adsorption regardless of whether the resulting product is highly coherent, self-supporting and physically homogeneous, or whether it is only partially coherent and self-supporting. Because the reaction products formed during the aforesaid adsorption reaction normally expand against the reaction chamber surfaces, the reaction products also provide for improved heat transfer due to the extent of physical contact with the heat transfer surfaces of the reactor. The aforesaid complex compound structures are achieved without using other binders, additives, mechanical sintering, baking or the like, but are accomplished substantially exclusively by carrying out the initial adsorption reaction under the proper volumetric expansion restriction and density maintenance conditions.

Optimum reaction rates are dependent on a number of independent parameters including the mass diffusion path length, the heat or thermal diffusion path length, as well as the thermal dynamic operating conditions. The latter include the overall process conditions i.e., the specific temperature and pressure conditions in which the process is carried out, the differential pressure or $\Delta P$, i.e., the difference between the operating or system pressure and the equilibrium pressure of the complex compound, and the approach temperature or $\Delta T$, which is typically greater than 8° K. for the first adsorption reaction. Finally, the parameter of the specific metal salt and the complex compounds formed between the salt and a specific selected polar gas must be considered, it being understood that the characteristics of such salts and the resulting complex compounds, including the equilibrium pressures thereof, are important determinations in balancing the aforesaid parameters to optimize reaction conditions and achieve a system having maximized reaction rates. As sometimes used herein, the term "optimized reaction product" or "optimized complex compound" is a complex compound in which the initial polar gas adsorption on the metal salt has been carried out under reaction conditions resulting in a complex compound reaction product having the aforesaid physical structure characteristics leading to an economic optimum.

Figure 2:
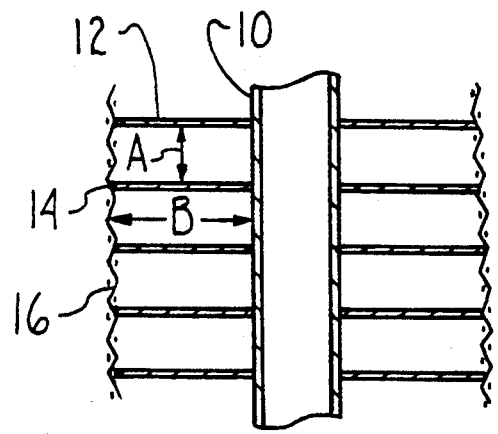
FIG. 2 is a side sectional elevation of a reactor of FIG. 1.

Each reaction chamber or reactor module has dimensions which provide basis for measuring or determining the thermal diffusion path length and the mass diffusion path length, respectively. The thermal path length is the distance from a highly thermally conductive surface to the center of the contiguous mass of complex compound. A heat conductive fin is an example of such a thermally conductive surface. Thermal diffusion in a given reactor is primarily a function of the fin count, i.e., the number of fins per unit of length (height) of the reactor modules. The greater the number of fins per unit of reactor length, the greater the thermal diffusion and the less the thermal diffusion path length. Observing FIGS. 1 and 2, a simplified two dimensional view of a reactor module is shown with a reaction chamber between plates 12 and 14 which extend radially from heat transfer fluid conduit 10. The thermal diffusion path is the longest path from a particulate to the nearest heat conductive surface. Thus, for the reaction chamber between heat fins or plates 12 and 14, the simplified thermal path length is one-half the distance A between the two fins 12 and 14. It will be understood that such a simplified path length determination does not take into consideration the tube wall, although that surface is also a contributor to the thermal path. Such a calculation, determination or measurement of the thermal path length can be readily determined for any three dimensional reaction chamber. The mean thermal path length is related to fin spacing, whereas the mean mass diffusion path length is related to fin height. The reactor shown is by way of illustration only, and other reactors shown and described in the aforesaid co-pending application are also examples, the description thereof which is incorporated herein by reference.

The size and shape of the fins or heat exchanger or thermal conducting surfaces is based on common heat transfer calculations understood by those skilled in the art. For example, observing also FIG. 4, the heat exchanger illustrated incorporates a plurality of heat exchange surfaces or fins extending vertically radially along heat exchange fluid conduit 30. The distance between the plates is varied because of the wedge-like shape of the different reaction chambers between adjacent plates which are not parallel. However, the average distance between two adjacent plates 36 and 38 will be measured at a point halfway between the inner and outer edges of the respective plates. In reactors of a design in which fin height is quite low or small, or in which the fin count is low, the proximity of a salt or complex compound molecule to a heat transfer tube surface becomes important in determining the thermal path length. Measurement and determination of the thermal path length may be made regardless of the shape or size of the adjacent solid fin or reaction chamber wall surfaces extending from and in thermal communication with the heat exchange conduit or conduits extending through the reactor. Such heat exchange surfaces, walls or fins also usually comprise the gas impermeable reactor module walls which define or form the reaction chamber or chambers within the reactor. Another example of a suitable reactor comprises a plate fin design known to those skilled in the art.

The mass diffusion path length is determined by measuring the distance between the point or surface of entry of the gas into the reaction chamber to the opposite end or wall of the chamber, which represents the greatest distance the gas must travel to and from molecules of complex compound during adsorption and desorption cycles. For example, again observing FIG. 2, in the simplified, two dimensional reactor shown, gas permeable wall 16 through which the gas enters and exits the reaction chambers extends around the outer edge of the heat exchange fins. The distance from the gas permeable wall to the opposite interior surface of a reaction chamber along conduit 10 is dimension B, which may be readily measured and determined. Observing also the reactor in FIG. 4, a mass diffusion path length dimension will be the distance between the outer edge of each of the reactor fins and the interior fin edge extending along conduit 30. Again, this dimension is readily determined for any reaction chamber size or shape. The average or mean mass transfer path distance will be ½ of the total distance.

From the above, it will be evident that both the thermal and mass diffusion path lengths may be changed or varied by selecting or designing a reactor having reaction chambers (modules) of desirable fin depth and reaction chamber height dimensions. An increase of the fin count, or number of fins per unit length of the reactor, will increase the thermal conductivity and reduce the thermal path length. Likewise, the mass diffusion path length may be selected by selecting or designing a reactor having a greater or smaller distance between the gas permeable wall through which the gaseous reactant passes during the alternate adsorption and desorption reaction phases, and the opposite inner end of the reaction chamber. In designing or selecting reactors and reaction chamber configurations, these two independent parameters may be considered and selected to give a reactor having the reaction chambers of the desired heat diffusion and mass diffusion path lengths giving optimum or preferred reaction rates.

It should be understood and appreciated that the "optimum" reactor module or reaction chamber dimensions and fin height and/or count or sorbent density will vary due to the process parameters for which the apparatus is to be used. For example, where the apparatus is to be used in a heat pump, the optimized reaction chamber dimensions and/or configurations including fin count, fin height, etc., may be quite different than a reaction chamber to be used in a thermal energy storage or low temperature freezer environment. In a heat pump, where the reaction cycle times are relatively short, and with $\Delta P$ typically about 1 bar or higher, and approach temperatures, $\Delta T$, typically between about 10° and 30° K., optimization of both heat and mass transfer is quite important. On the other hand, for the thermal energy storage systems where $\Delta P$ is often less than 1 bar, typically between about 0.15 and about 0.6 bar, and $\Delta T$ is often between about 4° and 8° K., the criterion of mass diffusion path length (mass transfer) is of significantly greater importance than heat transfer. Similarly, in low temperature freezer apparatus applications, to achieve cooling temperatures in the minus 70° F. range, the pressure changes ($\Delta P$) are very low, typically about 0.1 bar, with mass diffusion path length of significant importance as compared to the heat transfer characteristics of the apparatus. Thus, in such systems, it is necessary or desirable to design the apparatus with relatively low fins and/or lower compound density for optimizing the mass transfer or mass diffusion paths. Accordingly, it will be evident to those skilled in the art that optimization of the reactor modules or reaction chambers will take into consideration the intended uses of the equipment by considering the aforesaid parameters.

Another parameter to be determined is the mass of salt per unit volume of reaction chamber cavity, or loading density of the solid particulate metal salt introduced into the reactor and the optimum density of the resulting complex compound reaction product to achieve the optimum or desired reaction rates for adsorbing and desorbing the gaseous reactant to and from the complex compound. In order to achieve the desired or optimum density of the complex compound in a reactor having a fixed volume, the amount or volume of unreacted salt introduced into the reaction chambers must be sufficient so that when the complex compound is produced during the initial adsorption reaction, the volumetric expansion results in each reaction chamber being filled with the newly formed complex compound structure composition having the desired density. Normally, the density of the absorbent will be lower than the density of the salt before the initial reaction, although the density of a fully adsorbed complex compound is often higher. The density of the complex compound, will also vary depending on the operating conditions, i.e., pressure and temperature. Each salt and complex compound will react somewhat differently at different temperatures and pressures. Thus, such operating conditions, as well as the equilibrium pressure of the complex compound and the approach pressure, must be considered. Accordingly, the optimized density for each complex compound under such operating conditions must also be independently determined. One skilled in the art knowing the expansion characteristics of the complex compound to be produced, depending upon the salt and polar gas selected, the operating conditions to be used, and the measurement and determination of the independent gas diffusion path and thermal diffusion path dimensions of the reaction chamber or chambers, will also be able to determine the amount of the starting, unreacted particulate metal salt to be introduced into the reaction chamber according to the invention. Because of the complex nature of the combined mass diffusion and heat transfer processes, and taking in consideration the other parameters mentioned hereinabove to achieve the desired system characteristics, optimization of the system is usually performed experimentally by varying the approach temperatures and/or pressures, as well as the absolute temperature of the reactions, compound density and the geometry of the reactor module, and measuring the corresponding sorption rates.

Specific improvements in the reaction rates by optimizing the heat diffusion and mass diffusion path lengths and the complex compound density result in substantial improvements and increase in the reactor economics. This improvement substantially impacts on the efficiency of the complex compounds and concomitantly, the amount of energy which can be provided by the system or apparatus in a given reaction cycle period. For example, in some equipment applications reaction rates of approximately 10–15 moles/mol·hr. imply half-cycle periods of ten minutes, i.e., a ten minute time required for adsorbing or desorbing the desired amount of gaseous ligand from the complex compound. By comparison, reaction rates of 25 to 35 moles/mol·hr. imply half-cycle periods of five minutes, thereby at least doubling the energy available from such a system for a given time period of operation. Such improvement translates directly into substantially increased cooling and/or heating capacity for any given size of reactor systems. Thus, by reducing the cycle times as a result of the increased reaction rates, the tonnage of cooling capacity for a given amount or mass of complex compound used in the system or apparatus is correspondingly increased. Such an improvement allows for either greater cooling and/or heating capacities of heat pumps utilizing such improvements or substantially smaller and lighter heat pumps to produce a given amount of cooling and/or heating capacity.

The complex compounds for which improved reaction rates are achieved according to the present invention comprise the chemisorption reaction products of a metal salt in the form of a solid particulate reactant, on which is adsorbed a polar gaseous reactant capable of forming a covalent coordinative bond with the salt. The preferred complex compounds are disclosed in U.S. Pat. No. 4,848,994, the description of which is incorporated herein by reference, as are those described in the aforesaid incorporated co-pending application. The preferred polar gaseous reactants are ammonia, water, sulfur dioxide, lower alkanols ($C_1$–$C_5$), alkylamines, polyamines and phosphine. Preferred metal salts include the nitrates, nitrites, oxalates, sulfates, sulfites and halides, particularly chlorides, bromides and iodides of alkali metals, alkaline earth metals, transition metals, particularly chromium, manganese, iron, cobalt, nickel, copper, tantalum and rhenium, as well as zinc, cadmium, tin and aluminum. Double metal salts, particularly chlorides, in which the metals are selected from alkali or alkaline earth metals, aluminum, manganese, iron, nickel and cobalt are also useful. Another salt of special interest is $NaBF_4$. Other complex compounds are those disclosed in copending applications, Ser. No. 732,652 filed Jul. 19, 1991, U.S. Pat. No. 5,186,020 and Ser. No. 813,283 filed Dec. 20, 1991, U.S. Pat. No. 5,263,330, and incorporated herein by reference. Preferred complex compounds which are found to exhibit the aforesaid desired physical properties according to the invention are $CaCl_2 \cdot 4$–$8$ ($NH_3$), $CaCl_2 \cdot 2$–$4$ ($NH_3$), $CaCl_2 \cdot 0$–$1$ ($NH_3$), $CaCl_2 \cdot 1$–$2$ ($NH_3$), $CaBr_2 \cdot 2$–$6$ ($NH_3$), $CaI_2 \cdot 1$–$8$ ($NH_3$), $SrCl_2 \cdot 1$–$8$ ($NH_3$), $SrBr_2 \cdot 2$–$8$ ($NH_3$), $BaCl_2 \cdot 0$–$8$ ($NH_3$), $BaBr_2 \cdot 4$–$8$ ($NH_3$), $CoCl_2 \cdot 2$–$6$ ($NH_3$), $CoBr_2 \cdot 2$–$6$ ($NH_3$), $MgCl_2 \cdot 2$–$6$($NH_3$), $MgBr_2 \cdot 2$–$6$($NH_3$), $FeCl_2 \cdot 2$–$6$ ($NH_3$), $FeBr_2 \cdot 2$–$6$ ($NH_3$), $MnCl_2 \cdot 2$–$6$ ($NH_3$), $MnBr_2 \cdot 2$–$6$ ($NH_3$), $NiCl_2 \cdot 2$–$6$ ($NH_3$), $ZnCl_2 \cdot 2$–$6$ ($NH_3$), $CrCl_2 \cdot 0$–$3$ ($NH_3$), $CrCl_2 19$ $3$–$6$ ($NH_3$) and $SnCl_2 \cdot 0$–$2.5$($NH_3$). As previously discussed, $CaBr_2 \cdot 2$–$6$($NH_3$) possesses a modified structural integrity, but because a significant amount of the structural mass is self supporting and coherent, it is also preferred. Other complex compounds of special interest are $LiCl \cdot 0$–$3$($NH_3$), $CuSo_4 \cdot 2$–$4$($NH_3$), $NaBF_4 \cdot 0.5$–$2.5$($NH_3$) and $NaBr \cdot 0$–$5.25$($NH_3$).

The following examples are provided to illustrate the improvements and parameters used for determining reactor system optimization according to the invention. For comparing sorption rates at different loading densities, the following equation is useful, $$\Delta N = \Delta N_{max}(1 - e^{-kt})$$

where $\Delta N_{max}$ is the maximum amount of refrigerant that can be adsorbed, and $\Delta N$ is the amount adsorbed in time t. Values of k for the examples below are for $\Delta N$ in moles of refrigerant per mole of salt, and time t in minutes.

Fin count

Adsorption rate tests were run for $CaBr_2 \cdot 2$–$6$ $NH_3$ with the salt held at 108° C. and ammonia pressure of 3.93 bars applied. The heat exchanger had a fin height of 0.7 inches and salt was loaded at 0.7 grams of unammoniated salt per cubic centimeter of salt holding volume on the heat exchanger. For fin counts of 7, 12, and 14 fins/inch, the following results were obtained:

| Fin count | k |
| --- | --- |
| 7 | 0.068 |
| 12 | 0.142 |
| 14 | 0.118 |

Fin counts of 12 give the maximum sorption rates at these temperature and pressure conditions, with other heat exchanger parameters being equal.

Fin height

Adsorption rate tests were run for $CaBr_2 \cdot 2$–$6$ $NH_3$ with the salt held at 35° C. and ammonia pressure of 0.272 bar (−70° F. evaporator temperature) applied. The heat exchangers all had a fin count of 5 fins/inch and salt was located at a density of 0.6 grams of unammoniated salt per cc. Fin heights of 0.35", 0.375", and 0.40" were tested.

| Fin height | k |
| --- | --- |
| 0.350 | 0.073 |

-continued

| Fin height | k |
|---|---|
| 0.375 | 0.081 |
| 0.400 | 0.059 |

At these temperature and pressure conditions, a fin height of 0.375 gives the optimum reaction rate, although minimum system cost (cost per unit of cooling capacity obtained at −70° F.) is obtained with a fin height of 0.40 inches due to reduced heat exchanger and vessel costs.

Salt loading density

Adsorption rate tests were run for $CaBr_2 \cdot 2\text{-}6 \ NH_3$ at 3.93 bar with the salt at 108° C. All heat exchangers had a fin count of 7 fins/inch and a fin height of 0.40. Loading densities of 0.5, 0.6, and 0.7 grams salt/cubic centimeter salt holding volume on the heat exchanger were run:

| Loading density | k |
|---|---|
| 0.5 | 0.087 |
| 0.6 | 0.132 |
| 0.7 | 0.075 |

Maximum rates (maximum k) are obtained with a loading density of 0.6 g/cc. Minimum system cost is obtained with a loading density of 0.7 because more salt is contained in a given amount of heat exchanger and vessel volume.

The reactivity of the salts may be further enhanced by initially adsorbing a small amount of a gaseous ligand on the salt, which additive ligand is different from the gaseous reactant to be used in the complex compound. Any of the aforesaid polar gaseous reactants may be used, and particularly preferred are water, ammonia, lower aliphatic alcohol, amines, or phosphine. The amount of the additive material is preferably between about 0.05% and about 10% by weight of the salt. The use of a hydrated salt containing a small but effective amount of water adsorbed on the salt may be satisfactory for such a purpose.

For some adsorption/desorption cycle systems, it may be advantageous to use a mixture of a bivariant adsorbent, which does not expand substantially during adsorption of the polar refrigerant, with a monovariant complex compound described hereinabove. Specifically, in bivariant systems utilizing zeolite, activated carbon, activated alumina or silica gel as the adsorbent, which materials do not significantly expand volumetrically on adsorption of the polar refrigerant, the reaction product mass may be substantially improved by combining such adsorbent materials with a metal salt which forms a complex compound during the adsorption reaction with the polar gas. This embodiment may be especially useful for water or ammonia refrigerant systems. The advantage of mixing the metal salt with the bivariant adsorbent is that the resulting adsorbent mass will substantially take on the highly desirable features of the complex compound mass described hereinabove, i.e., the coherent, cohesive, self-supporting structural physical mass having the improved, increased reaction rates as described hereinabove. Any of the aforesaid salts may be used to mix with the bivariant materials, although the salts resulting in the aforesaid specific complex compounds are preferred. The amount of salt used in the mixture may be between about 5% and about 25%, by weight, depending on the specific salt, as well as the aforesaid variables including the reactor design mass diffusion path length, thermal or heat diffusion path length, and loading density, all of which are dependent on the operating conditions. It will be understood that to obtain the desired improved results utilizing the mixture of the bivariant and monovariant adsorbent materials, the latter which expand substantially during the initial adsorption reaction with a polar gas, requires density control of the adsorbent mass by restricting volumetric expansion of the mixture of combined adsorbents during the initial adsorption reaction as described hereinabove.

The mixture of bivariant and monovariant adsorbents may also be used to advantage in non-polar gaseous refrigerant systems. Groups of such non-polar refrigerants include the natural gas $C_1$–$C_6$ lower alkanes, e.g. methane, ethane, propane, butane, pentane and hexane, cyogenic refrigerants helium, argon and hydrogen, environmental gases oxygen, nitrogen, hydrogen, $No_x$, $CO_2$ and $CO$, and CFC, HCFC and HFC fluorocarbon refrigerants. For example, in systems in which methane is to be adsorbed on a zeolite, an aforesaid metal salt may be mixed with the zeolite, and a polar gas charged to the solid mixture which is adsorbed to form a complex compound with the monovariant salt thereby achieving a reaction product mass having the aforesaid improved physical characteristics. Following the initial adsorption, the polar gas is desorbed from the product mass and purged from the reactor. The system is then charged with the non-polar gas and the desired adsorption and desorption reactions may be carried out. Such an advantage may be used for any of the aforesaid bivariant adsorbents with any desired non-polar refrigerant system, providing the mixture of solid monovariant and bivariant adsorbents is first charged with a polar gaseous reactant to produce a mixture including the complex compound having the desired physical improvements. Similarly, the aforesaid improvements may be used in metal hydride adsorbents systems by mixing an aforesaid metal salt with a metal hydride, charging the mixture with ammonia, or other polar gas, to form a complex compound, desorbing the complex compound and purging ammonia from the reactor, and thereafter charging the system with hydrogen to carry out hydrogen adsorption and desorption on the metal hydride. Thus, the invention may be used broadly to improve systems and processes which use a non-expanding solid adsorbent reactant and a polar or non-polar gas to be alternately adsorbed and desorbed thereon. According to the invention, by mixing such non-expanding adsorbents with a suitable amount of a solid reactant which volumetrically expands upon adsorbing a gaseous reactant, and in which restriction and control of such expansion results in an adsorption reaction product having the aforesaid improved physical and/or sorption characteristics, improved system reaction rates may be achieved.

Because of the significant improvement of reaction rates offered by the aforesaid complex compounds, it may be advantageous to combine one of the aforesaid salts with any other adsorbent reactant, i.e., one which is outside of the scope of the aforesaid salts and complex compounds, or which does not achieve the results of improved reaction rates such as described herein.

It may also be advantageous to utilize a mixture of the two or more aforesaid metal salts, for example, one salt which yields a relatively high volumetric expansion complex compound and another salt which has a lower volumetric complex compound expansion. By using a mixture or combination of such salts, for example strontium chloride with calcium chloride or magnesium chloride, or calcium bromide with calcium chloride, the resulting structure may have reaction rates improved from either of the salts, when used alone.

According to another embodiment, the aforesaid reaction rate improvement achieved by optimizing the independent parameters of density, and heat transfer and mass transfer path lengths, may also be applied to gas adsorption reaction products that do not volumetrically expand during adsorption, as generally disclosed in my aforesaid application, and which is incorporated by reference herein. Thus, the reaction rates of reaction products formed between the aforesaid polar gaseous reactants on zeolites, activated carbon, activated alumina and silica gel, as well as metal hydrides, may be improved according to the aforesaid method of determining the reaction process parameters and reaction conditions to be used, selecting the particular solid and polar gas to be used, determining the desired adsorption reaction rates in which the system is to be used, determining the thermal and mass diffusion path lengths, respectively, which will yield the desired reaction rates, providing the reactor having the desired reactor cavity dimensions, loading the solid reactant into the reactor at the desired loading density, and maintaining the desired density throughout the reaction process. This may be accomplished in a fixed volume reactor by loading the reactor with solid at the desired density, using necessary compaction, or in a reactor having one or more movable reactor surfaces for maintaining necessary compression against the reactant during the chemisorption reactions.

Figure 3:
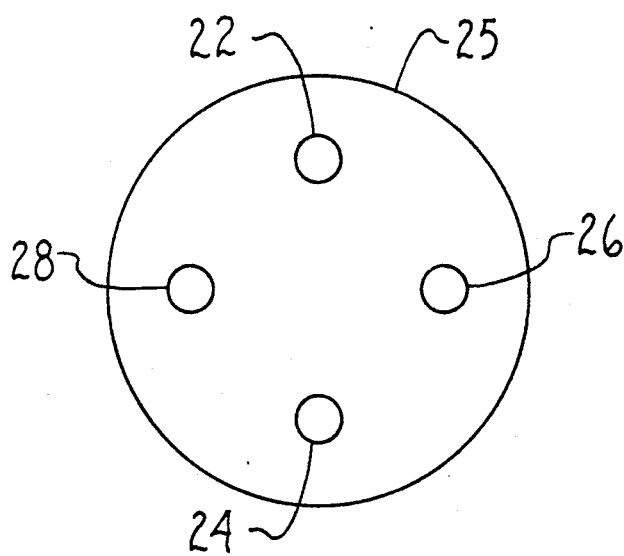
FIG. 3 is a top view illustrating another reactor embodiment.
Figure 4:
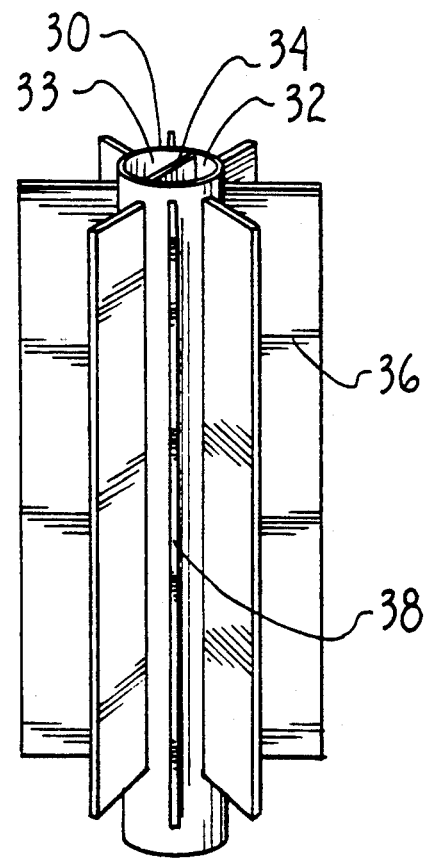
FIG. 4 is a prospective view illustrating another reactor embodiment.

In yet another embodiment of the invention, as shown in FIGS. 3 and 4, there are illustrated reactors having multiple heat transfer fluid channels. Specifically, in FIG. 3, there is shown a top of a reactor fin or plate 25 through which extend four heat transfer conduits 22, 24, 26 and 28. These different tubes may be used to direct a heat exchange fluid at different times during the reaction cycle, or to provide different channels for different heat exchange fluids or different use of time and temperature for one or more fluids. For example, during desorption, two of the channels may be used for passage of a heating fluid, while the other two channels are not used during the desorption. During adsorption, the two other channels may be used for passage of a cooling fluid while the heating fluid channels are not used. The different channels may be used for phase change heat exchange fluids, which change between gas and liquid phase during heat transfer, or for directing different heat exchange fluids through different channels at different times during the reaction cycle. Branching headers or manifolds at the ends of the reactors or otherwise outside of the reactors to which the different tubes are connected may be used. Another means providing different fluid paths is illustrated in the reactor construction shown in FIG. 4 in which divider 34 extends along conduit 30 having different fluid flow conduit paths 32 and 33. Again, like the previously described embodiment, such a device will provide a dual path for different heat exchange fluids of the same or different phases.

In designing a system to take advantage of the improved reaction products described herein, it should be understood that determination of the technical parameters to optimize mass diffusion path length, heat diffusion path length and loading density to maximize sorption rates, although important, must also take into consideration practical parameters. As previously stated, optimization is performed to meet goals of specific operating needs and applications for the apparatus. Practical parameters include the volume of the apparatus, the amount of salt used, as well as the heat exchange requirements of the system. For example, heat exchange component size to achieve the lowest apparatus volume, size and weight and a system which uses a relatively small amount of adsorbent may be important considerations in arriving at the ultimate equipment and system design. Minimum system cost is important for residential heat pump sorbers, while minimum system mass is required for other systems, for example, where the apparatus is to be placed in orbit for use in the space program. In yet other systems such as certain consumer products, relatively small sorber volumes may be required. Such factors may be considered in qualifying or tempering the optimum technical parameters which have been independently determined according to the invention.

What is claimed is:

1. A method of increasing reaction rates in a chemisorption reaction process in which a polar gas is repeatedly alternately absorbed and desorbed on a complex compound formed by adsorbing said polar gas on a metal salt, said complex compound capable of having a first density if allowed to expand without restriction during said adsorption, said method comprising:

controlling the volumetric expansion of said complex compound formed during at least the initial adsorption reaction of said polar gas on said metal salt to form at least a partially structurally immobilized, self-supporting, coherent, reaction product mass having a second density and capable of increased reaction rates in which the number of moles of gaseous reactant adsorbed and/or desorbed per mole of said salt, per hour, is increased as compared to a complex compound formed without controlling said volumetric expansion and carrying out said chemisorption reaction process using said complex compound having said second density at said increased reaction rates.

2. The process of claim 1 including providing a reaction chamber having a fixed volume defined between one or more heat exchange walls and one or more gas permeable walls, and carrying out said reaction therein.

3. The process of claim 2 including providing a reaction chamber having a first dimension comprising a mass diffusion path for said polar gas from said one or more gas permeable walls through said metal salt, and a second dimension comprising a thermal diffusion path from said one or more heat exchange walls through said metal salt.

4. The process of claim 1 wherein said polar gas is ammonia and said metal salt comprises $SrCl_2$, $SrBr_2$, $CaCl_2$, $CaBr_2$, $CaI_2$, $CoCl_2$, $CoBr$, $BaCl_2$, $BaBr_2$, $MgCl_2$, $MgBr_2$, $FeCl_2$, $FeBr_2$, $NiCl_2$, $ZnCl_2$, $SnCl_2$, $MnCl_2$, $MrBr_2$, $CrCl_2$ or mixtures thereof.

5. The process of claim 1 wherein said polar gas is ammonia and said metal salt comprises $CaBr_2$.

6. The process of claim 4 wherein said metal salt comprises a mixture of two or more of said metal salts.

7. The process of claim 6 wherein one of said metal salts of said mixture comprises $CaBr_2$.

8. A method of increasing reaction rates in a chemisorption reaction process in which a polar gas is repeatedly alternately adsorbed and desorbed on a complex compound formed by adsorbing said polar gas on a metal salt in one or more reaction chambers, said complex compound capable of having a first density if allowed to expand without restriction during said adsorption, said method comprising:
  determining the chemisorption process parameters and reaction conditions for which said process is to be used,
  selecting a metal salt and polar gas to be used in said process,
  determining desired chemisorption reaction rates for said metal salt and polar gas,
  determining the mass diffusion path length for said polar gas comprising a first reactor dimension and the thermal diffusion path length comprising a second reaction dimension, which will result in the said desired chemisorption reaction rates,
  providing a reactor having said one or more reaction chambers having said first and second dimensions, and
  carrying out said chemisorption reaction in said reactor while controlling the volumetric expansion of said complex compound during at least the initial adsorption reaction to form a reaction product in which at least a portion of the mass is structurally immobilized and self-supporting, having a second density and capable of increased chemisorption reaction rates as compared to a complex compound formed without controlling said volumetric expansion, and carrying out said reaction process using said complex compound having said second density at said increased reaction rates.

9. The process of claim 8 wherein said reaction chamber is provided with a fixed volume defined between one or more heat exchange walls and one or more gas permeable walls.

10. The process of claim 9 wherein said reaction chamber is provided with a first dimension comprising a mass diffusion path for said polar gas from said one or more gas permeable walls through said metal salt, and a second dimension comprising a thermal diffusion path from said one or more heat exchange walls through said metal salt.

11. The process of claim 8 wherein said metal salt comprises $SrCl_2$, $St_2Br_2$, $CaCl_2$, $CaBr_2$, $CaI_2$, $CoCl_2$, $CoBr_2$, $BaCl_2$, $BaBr_2$, $MgCl_2$, $MgBr_2$, $FeCl_2$, $NiCl_2$, $ZnCl_2$, $SnCl_2$, $MnCl_2$, $MgBr_2$, $CrCl_2$ or mixtures thereof.

12. The process of claim 11 wherein said metal salt comprises a mixture of two or more of said metal salts.

13. Process of claim 12 wherein said polar gas is ammonia.

14. Process of claim 13 wherein one of said metal salts of said mixture is $CaBr_2$.

15. Process of claim 14 wherein said polar gas is ammonia.

16. Process of claim 11 comprising mixing said metal salt with zeolite, activated carbon, activated alumina or silica gel prior to said chemisorption reaction.

17. A method of increasing reaction rates in a chemisorption reaction process in which a polar gas is alternately adsorbed and desorbed on a reaction produce of zeolite, activated carbon, activated alumina or silica gel and said polar gas, said method comprising:
  mixing said zeolite, activated carbon, activated alumina or silica gel with a metal salt comprising a halide, nitrate, nitrite, oxalate, sulfate or sulfite of an alkali metal, alkaline earth metal, transition metal zinc, cadmium, tin aluminum, sodium borofluoride, or double metal chloride.
  introducing the mixture of said zeolite, activated carbon, activated alumina or silica gel and said metal salt in a reaction chamber, and
  adsorbing said polar gas on said mixture while limiting the volumetric expansion of the reaction product during at least the initial adsorption reaction to form at least a partially coherent, cohesive, physically self-supporting reaction product capable of increased chemisorption reaction rates as compared to a mixture in which said complex compound is formed without controlling said volumetric expansion, and carrying out said reaction process using said mixture containing said reaction product at said increased chemisorption reaction rates.

18. The process of claim 17 wherein said polar gas is ammonia and said metal salt comprises $SrCl_2$, $SrBr_2$, $CaCl_2$, $CaBr_2$, $CaI_2$, $CoCl_2$, $CoBr_2$, $BaCl_2$, $BaBr_2$, $MgCl_2$, $MgBr_2$, $FeCl_2$, $FeBr_2$, $NiCl_2$, $ZnCl_2$, $SnCl_2$, $MnCl_2$, $MgBr_2$, $CrCl_2$ or mixtures thereof.

19. The process of claim 17 wherein said polar gas is ammonia and said metal salt comprises $CaBr_2$.

20. The process of claim 18 wherein said metal salt comprises a mixture of two or more of said metal salts, one of which is $CaBr_2$.

21. The process of claim 17 wherein said polar gas comprises ammonia or water or mixtures thereof.

22. A method of increasing reaction rates in a sorption reaction process in which a non-polar gas is alternately adsorbed and desorbed on a reaction product of said gas and an adsorbent comprising zeolite, activated carbon, activated alumina, silica gel or a metal hydride, said method comprising:
  mixing said adsorbent with a metal salt comprising a halide, nitrate, oxalate, sulfate, or sulfite of an alkali metal, alkaline earth metal, transition metal, zinc, cadmium, tin aluminum, sodium boroflouride, or double metal chloride,
  introducing said mixture in a reaction chamber, adsorbing a polar gas on said mixture and forming a complex compound of said polar gas and said metal salt while limiting the volumetric expansion of the complex compound during at least the initial adsorption reaction to form at least a partially coherent, cohesive, physically self-supporting reaction product capable of increased reaction rates as compared to a complex compound formed without limiting the volumetric expansion,
  desorbing said polar gas from said complex compound and purging said polar gas from said reaction chamber, and
  introducing said non-polar gas into said reaction chamber and carrying out said sorption reaction at said increased reaction rates.

23. The process of claim 22 wherein said non-polar gas comprises hydrogen and said adsorbent comprises a metal hydride.

24. The process of claim 22 wherein said polar gas is ammonia and said metal salt comprises $SrCl_2$, $SrBr_2$, $CaCl_2$, $CaBr_2$, $CaI_2$, $CoCl_2$, $CoBr_2$, $BaCl_2$, $BaBr_2$, $MgCl_2$, $MgBr_2$, $FeCl_2$, $FeBr_2$, $NiCl_2$, $ZnCl_2$, $SnCl_2$, $MnCl_2$, $MgBr_2$, $CrCl_2$ or mixtures thereof.

25. The process of claim 22 wherein said non-polar gas comprises a $C_1$ to $C_6$ lower alkane or mixtures thereof, helium, argon, hydrogen, oxygen, carbon dioxide, carbon monoxide, $NO_x$ or a fluorocarbon refrigerant and said adsorbent comprises zeolite, activated carbon, activated alumina or silica gel.

26. The process of claim 25 wherein said polar gas is ammonia and said metal salt comprises $SrCl_2$, $SrBr_2$, $CaCl_2$, $CaBr_2$, $CaI_2$, $CoCl_2$, $CoBr_2$, $BaCl_2$, $BaBr_2$, $MgCl_2$, $MgBr_2$, $FeCl_2$, $FeBr_2$, $NiCl_2$, $ZnCl_2$, $SnCl_2$, $MnCl_2$, $MgBr_2$, $CrCl_2$ or mixtures thereof.

27. The process of claim 22 wherein said non-polar gas comprises a $C_1$ to $C_6$ alkane.

28. The process of claim 22 wherein said non-polar gas comprises hydrogen, oxygen, nitrogen, carbon dioxide, carbon monoxide, $NO_x$, or mixtures thereof.

29. The process of claim 22 wherein said non-polar gas comprises a fluorocarbon refrigerant.

* * * * *